Patented July 16, 1946

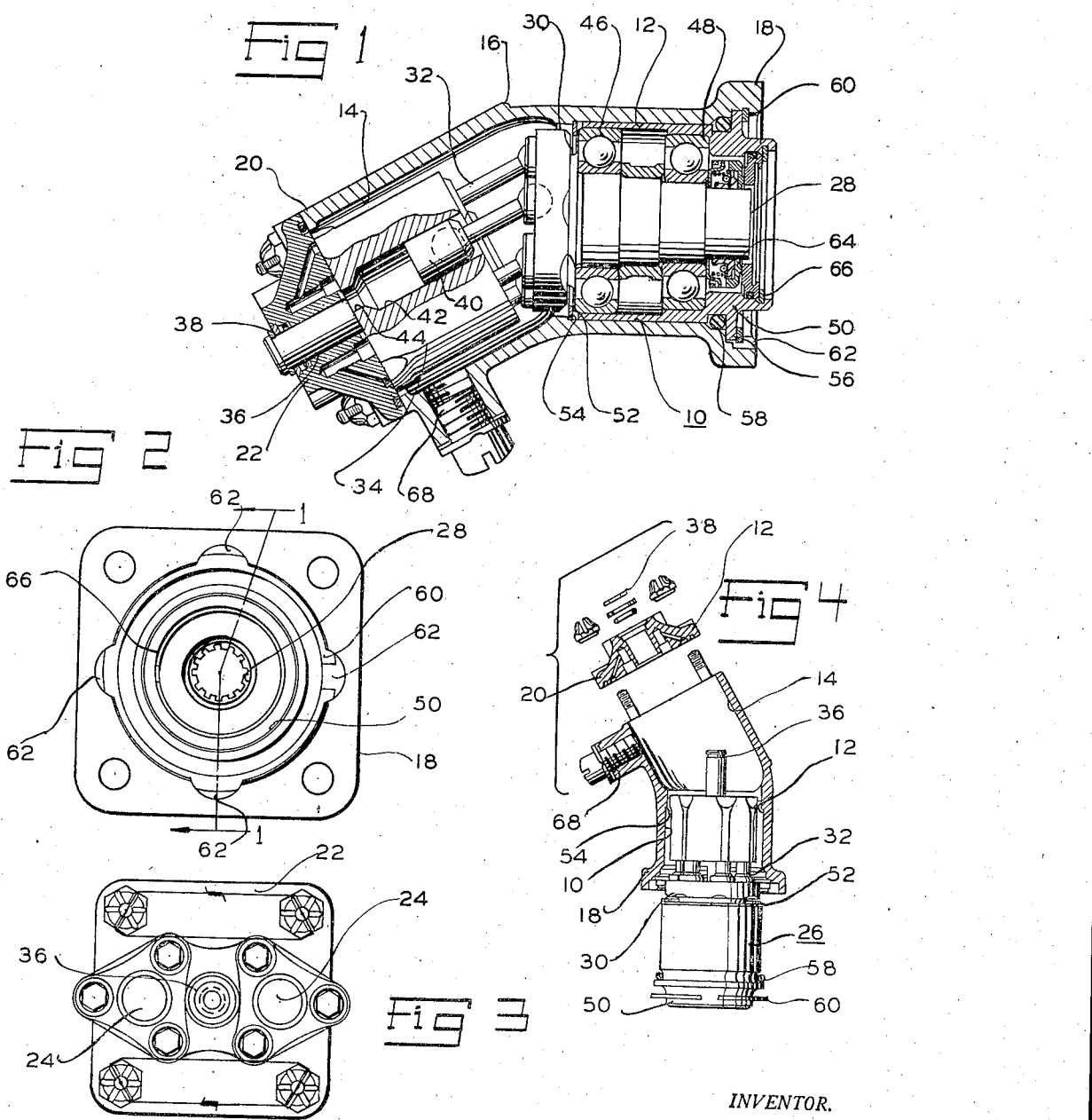

2,404,309

UNITED STATES PATENT OFFICE 2,404,309

POWER TRANSMISSION

Joseph A. Martin, Detroit, Mich., assignor to Vickers Incorporated, Detroit, Mich., a corporation of Michigan Application July 15, 1944, Serial No. 545,119

1 Claim. (Cl. 103—162)

This invention relates to power transmissions, particularly to those of the type comprising two or more fluid pressure energy translating devices, one of which may function as a pump and another as a fluid motor.

The invention is more particularly concerned with an improved construction for a fixed displacement device of the class having piston and cylinder mechanism, the axis of which is disposed at an angle to the drive shaft. Devices of this class have heretofore been constructed customarily with a housing comprised of two tubular sections, one of which is at an angle to the other.

It is an object of the present invention to provide an improved construction including a unitary tubular housing which permits of assembly of the complete working parts of the pump into the bent tube which forms the housing by insertion from one end to provide a compact, economical construction.

Further objects and advantages of the present invention will be apparent from the following description, reference being had to the accompanying drawing wherein a preferred form of the present invention is clearly shown.

In the drawing:

Figure 1 is a longitudinal cross sectional view of a pump or motor embodying a preferred form of the present invention taken on line 1—1 of Figure 2.

Figure 2 is a righthand end view of the device shown in Figure 1.

Figure 3 is a lefthand end view of the device shown in Figure 1.

Figure 4 is an exploded view illustrating the method of assembly of the device.

Referring now to the drawing, in Figure 1 a unitary tubular housing 10 is formed with two straight cylindrical portions 12 and 14 joined by a bend 16 and is provided with square flanges 18 and 20 at its opposite ends. Mounted on the flange 20 is a valve plate 22 of conventional construction provided with two arcuate ports, not shown, which communicate with inlet and outlet ports 24.

Mounted within the housing 10 is a revolving group subassembly generally designated as 26 in Figure 4 which consists of a drive shaft 28 having a flange 30 carrying a series of piston rods 32 articulated thereto by ball and socket joints. A cylinder barrel 34 abuts the valve plate 22 and is rotatably mounted upon a cylinder shaft 36 which projects through the valve plate and is retained therein by a snap ring retainer and seal at 38. Pistons 40 are articulated to the ends of each of the connecting rods 32 and are mounted to reciprocate within the respective bores 42 of the cylinder barrel 34. The latter have individual arcuate ports 44 adapted to register in turn with the respective inlet and outlet ports of the valve plate as the cylinder barrel makes a complete revolution.

The drive shaft 28 is carried on anti-friction radial and thrust bearings 46 and 48, respectively. These bearings are mounted in a retainer sleeve 50 which telescopes within the cylindrical portion 12 of the housing with a sliding fit. A washer 52 provides a stop between the lefthand end of the retainer 50 and a shoulder 54 formed at the lefthand end of cylindrical portion 12. The shoulder 54 is of sufficient diameter to permit passage of the flange 30 and the cylinder barrel 34 when the device is assembled, and the washer 52 prevents movement of the radial bearing 46 past the shoulder 54.

The retainer 50 is provided with a flange 56 near its righthand end which partially encloses a sealing ring 58 adapted to seal the clearance between the housing 10 and the retainer 50. A snap ring 60 is positioned in a groove at the righthand end of the housing 10 and abuts the flange 56 to lock the retainer 50 in place in the housing 10. A plurality of arcuate recesses 62 (see Figure 2) are provided at spaced points around the periphery of the snap ring receiving groove to permit insertion of a suitable tool for removal of the snap ring. A suitable shaft seal 64 is mounted in the retainer 50 and held in position by a snap ring 66. A drain connection 68 is provided in the cylindrical portion 14 of the housing 10.

In operation, with the device considered as a pump, the drive shaft 28 is rotated and, through the medium of a universally jointed shaft, not shown, drives the cylinder barrel 34 which rotates upon the pin 36 and the valve plate 22. The pistons are caused to move in and out of their respective bores during this rotation, and the bores communicate alternately with the inlet port while the pistons are withdrawing and with the outlet port while the pistons are advancing into their cylinder bores. The action of the pump is conventional in this regard.

Figure 4 illustrates the method of original assembly of the pumping mechanism into the one-piece bent tubular housing. For this purpose the complete revolving group, including the cylinder barrel, pistons, drive shaft, bearings, and bearing retainer, is first assembled apart from the housing and is then inserted into the latter from the drive shaft end. For this purpose the cylinder and piston mechanism, being flexibly mounted to the drive shaft mechanism by the articulated joints of the connecting rods and universally jointed drive shaft, is able to pass through the bend 16 of the housing at the same time that the bearing retainer is telescoped into the cylindrical portion 12. When the telescoping action is complete, the snap ring 60 may be inserted in position to lock the entire revolving group subassembly into the housing. The valve plate 22 may then be assembled over the cylinder bearing pin 36 and secured to the housing flange 20, thus completing assembly of the unit. Disassembly obviously is performed in the reverse manner.

It will thus be seen that the present invention provides a compact, economical construction for a fluid pump or motor of this class which is readily adapted to quantity production.

While the form of embodiment of the invention as herein disclosed constitutes a preferred form, it is to be understood that other forms might be adopted, all coming within the scope of the claim which follows.

What is claimed is as follows:

A fluid pump or motor device comprising a unitary tubular housing having two straight cylindrical portions angularly disposed to each other and joined by a bend, a revolving group assembly comprising piston and cylinder mechanism and cylinder driving mechanism, a drive shaft provided with bearings and with a bearing retaining sleeve and connected to said cylinder driving mechanism, said assembly being insertable from one end of the housing by passing the piston and cylinder mechanism through the bend in the housing and by simultaneously telescoping the retainer sleeve into one of the straight housing portions, means for locking the retainer sleeve in position in the housing, and valve means providing inlet and outlet ports for the device.

JOSEPH A. MARTIN